(12) United States Patent
Nozaki

(10) Patent No.: US 7,955,466 B2
(45) Date of Patent: Jun. 7, 2011

(54) METHOD OF AND APPARATUS FOR MANUFACTURING POLARIZATION PLATE

(75) Inventor: Atsuo Nozaki, Hachioji (JP)

(73) Assignees: JRS Corporation, Tokyo (JP); Sumitomo Chemical Co., Ltd., Tokyo (JP); Dai Nippon Printing Co., Ltd., Tokyo (JP); Toppan Printing Co., Ltd., Tokyo (JP); NEC Corporation, Tokyo (JP); Hitachi Chemical Co., Ltd., Tokyo (JP)

( * ) Notice: Subject to any disclaimer, the term of this patent is extended or adjusted under 35 U.S.C. 154(b) by 472 days.

(21) Appl. No.: 11/663,200

(22) PCT Filed: Mar. 25, 2005

(86) PCT No.: PCT/JP2005/005485
§ 371 (c)(1), (2), (4) Date: Oct. 20, 2008

(87) PCT Pub. No.: WO2006/103715
PCT Pub. Date: Oct. 5, 2006

(65) Prior Publication Data
US 2009/0205773 A1 Aug. 20, 2009

(51) Int. Cl.
*B29C 65/00* (2006.01)
*B32B 37/00* (2006.01)

(52) U.S. Cl. ........ 156/250; 156/261; 156/324; 156/516; 349/96; 349/117

(58) Field of Classification Search ............. 349/96, 349/117, 118; 359/489; 156/60, 65, 250, 156/253, 261, 510, 516, 324, 543, 547–551
See application file for complete search history.

(56) References Cited

U.S. PATENT DOCUMENTS
2004/0041968 A1 * 3/2004 Otoshi et al. ............. 349/117

FOREIGN PATENT DOCUMENTS
JP 2004020701 * 1/2004
JP 2004184575 * 7/2004
* cited by examiner

*Primary Examiner* — Kat Wyrozebski
*Assistant Examiner* — Scott W Dodds
(74) *Attorney, Agent, or Firm* — Flynn, Thiel, Boutell & Tanis, P.C.

(57) ABSTRACT

When a polarization plate is manufactured by laminating and laminating at least two types of retarder films onto a polarizer film by a laminating apparatus, with the two films of at least the two types of retarder films and at least the polarizer films being laminated such that the difference in the angle between the feeding directions of the two films is within the range of 40° to 80°. With this arrangement, a good handling property can be obtained, improvement in yield ratio can be expected, and the installation area of the laminating apparatus can be reduced due to a reduction in size of the laminating apparatus.

6 Claims, 10 Drawing Sheets

METHOD OF AND APPARATUS FOR MANUFACTURING POLARIZATION PLATE

TECHNICAL FIELD

The present invention relates to a method of and an apparatus for manufacturing a polarization plate composed of a polarizer onto which at least two retarder having a different drawing direction are laminated.

BACKGROUND ART

Japanese Patent Application Laid-Open No. 11-231129 teaches a polarization plate that is used as an optical component such as a liquid crystal display device. The polarization plate is formed by laminating a polarizer film and a retarder film. These polarization plates are known to be used in TN (twisted nematic) type liquid crystal display devices, semi-transparent reflection type display devices, and the like, and are known to have an angle relative to the lamination of the retarder film to the polarizer film that is 15°±10°, 75°±10°.

DISCLOSURE OF THE INVENTION

Problems to be Solved by the Invention

Incidentally, since a retarder film, which is cut off for laminating, may be formed in a very slender parallelogram shape depending on the angle of the retarder film to be laminated to a polarizer film, there is a high possibility that a handling property deteriorates before the retarder film is laminated, that is, the yield is lowered.

Since the cut-out retarder film is formed in a very slender parallelogram shape, a problem arises in that the size of an apparatus for manufacturing it is increased, that is, the cost of the apparatus is increased, among other things.

Accordingly, an object of the present invention, which was made in view of the above circumstances, is to provide a method of and an apparatus for manufacturing a polarization plate such that a good handling property can be obtained, improvement in yield ratio can be expected, and the size and the installation area of the apparatus can be reduced.

Means for Solving the Problems

To overcome the above-discussed problems, the present invention is arranged as described below.

An invention according to (1) is characterized by a method of manufacturing a polarization plate by laminating at least two types of retarder films onto a polarizer film, wherein the two films of at least the two types of retarder film and at least the polarizer film, are laminated such that the difference of the angle between the feeding directions of the two films is within the range of 40° to 80°.

An invention according to (2) is characterized in a method of manufacturing a polarization plate according to (1), wherein the angle of at least one of the retarder films in the feeding direction thereof to the polarizer film is 15°±10° or 75°±10°.

An invention according to (3) is characterized in an apparatus for manufacturing a polarization plate by laminating at least two types of retarder films onto a polarizer film, wherein the apparatus is composed of a polarizer film transport means for transporting the polarizer film, a retarder film transport means for transporting at least the two types of retarders, and a laminate/punch means for laminating and punching the two films of at least the two types of retarder films and at least the polarizer films, such that the difference of the angle between the feeding directions of the two films is within the range of 40° to 80°.

An invention according to (4) is characterized in an apparatus for manufacturing a polarization plate according to (3), wherein the angle of at least one of the retarder films in the feeding direction thereof to the polarizer film is 15°±10° or 75°±10°.

EFFECT OF THE INVENTION

With the above arrangements, the present invention has the following effects.

According to (1) and (3), since the two films of at least the two types of retarder films, including at least the polarizer film, are laminated such that the difference in the angle between the feeding directions of the two films is within the range of 40° to 80°, the laminated films are not made to, for example, an extremely slender parallelogram shape. Accordingly, a good handling property can be obtained and an improvement in yield ratio can be expected as well since the size of the apparatus can be reduced, an increase in the length of the apparatus can be prevented by reducing the installation area thereof.

According to (2) and (4), the polarization plate can be obtained using at least the two types of retarder films having a different feeding direction in which the angle of at least one of the retarder films in the feeding direction thereof to the polarizer film is 15°±10° or 75°±10°.

BEST MODE FOR CARRYING OUT THE INVENTION

An embodiment of a method of and an apparatus for manufacturing a polarization plate of the present invention will be explained below in detail based on the drawings. Although the embodiment of the present invention shows a most preferable mode of the invention, the invention is not limited thereto.

Figure 1:
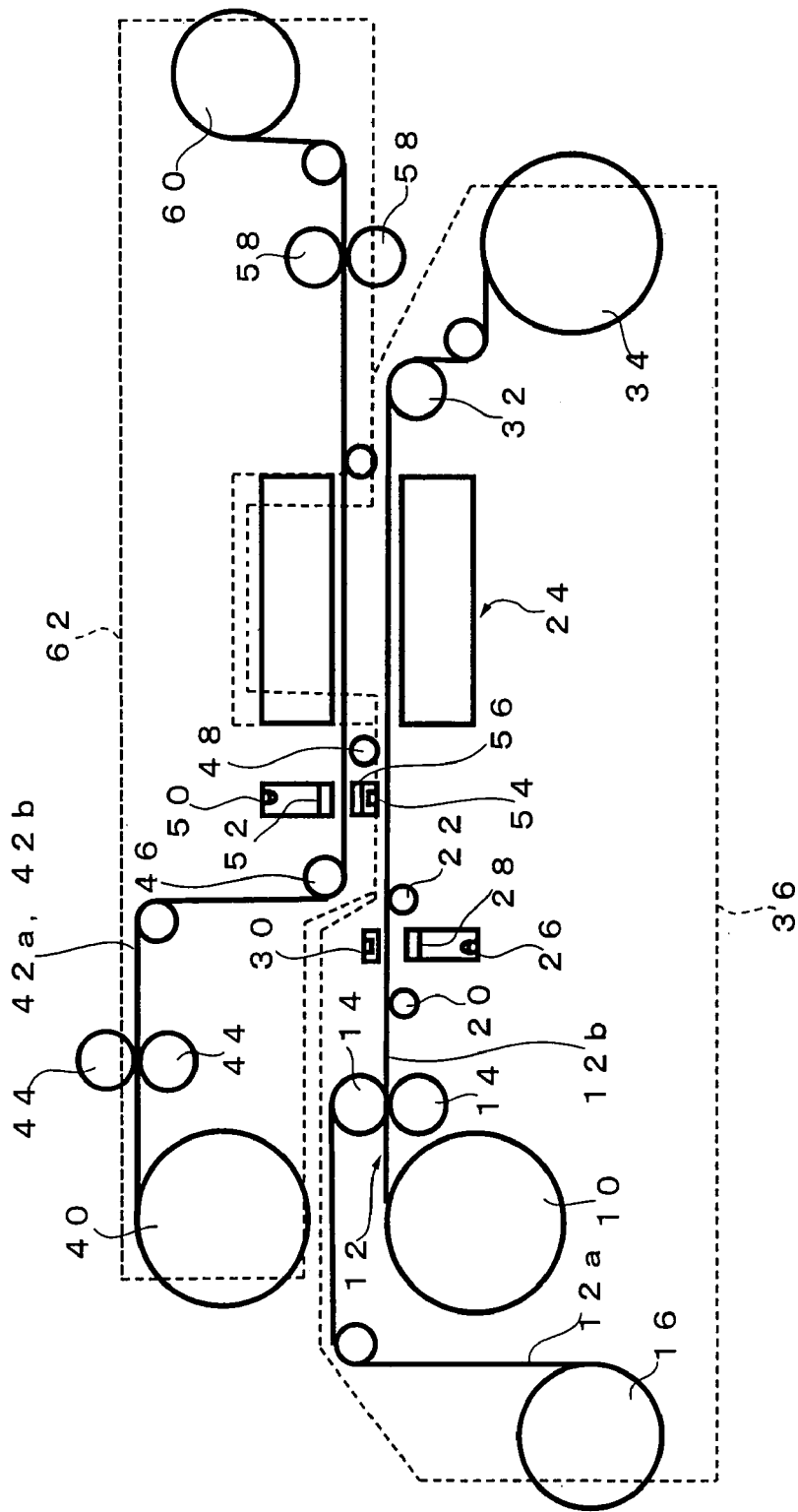
FIG. 1 is a side elevational view of an apparatus for manufacturing a polarization plate when a polarizer film and at least two types of retarder films of the present invention are supplied in a rolled state and used, respectively and a laminated product is obtained in the rolled state.
Figure 2:
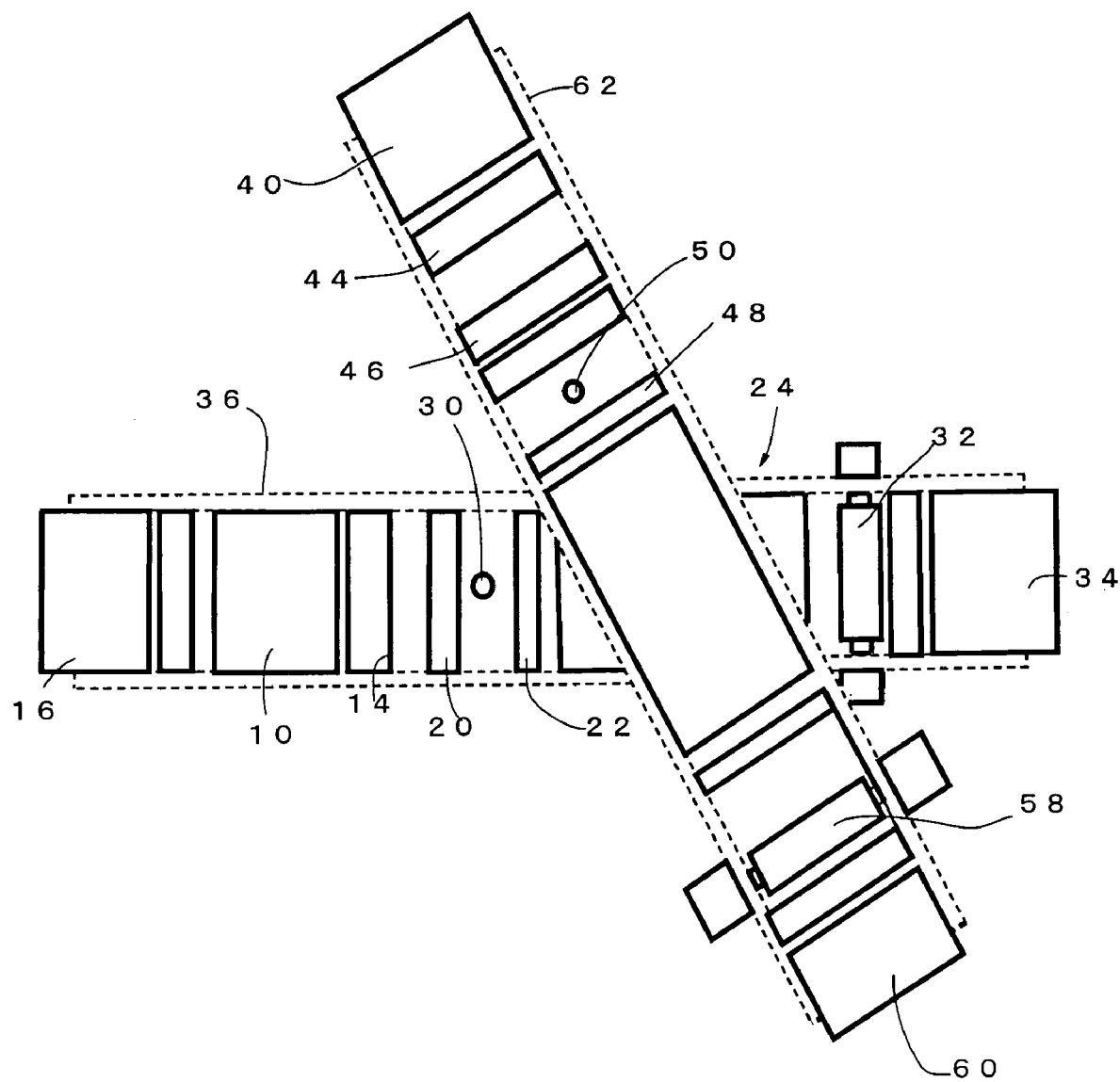
FIG. 2 is a top view of the polarization plate manufacturing apparatus when the polarizer film and at least two types of retarder films of the present invention are supplied in the rolled state and used, respectively and the laminated product is obtained in the rolled state.

REFERENCE NUMERALS 10 unwinder
12 film
12a release film
12b polarizer film
12c protection film
24 laminate/punch unit
26 light source
28 polarization device
30 photodetector
34 rewinder
40 unwinder
42a, 42b retarder films
50 light source
52 polarization device
54 polarizer
56 photodetector
60 rewinder

DETAILED DESCRIPTION OF THE INVENTION

A strip-shaped film 12 composed of a polarizer film 12b and a release film 12a having a sticky agent applied thereto and laminated to the polarizer film 12b is unwound from an unwinder 10 through nip rolls 14. The release film 12a is removed from the film 12 by a rewinding roll 16 along the nip rolls 14, and the polarizer film 12b to which the sticky agent is applied is supplied to a laminate/punch device 24 constituting a laminate/punch means through free rolls 20 and 22, thereby a polarizer film transport means for transporting the polarizer film 12b is arranged.

A light source 26 composed of an incandescent lamp, a polarization device 28, and a photodetector 30 composed of a photodiode are disposed between the free rolls 20 and 22 to detect and control the angle of the polarizer film 12b. More specifically, the absorption axis of the polarization device 28 is disposed in parallel with the roll axes of the unwinder 10, the nip rolls 14, and the free rolls 20 and 22, the angle of the polarizer film 12b is controlled by an axially-movable rubber grip roll 32 so that the intensity of the light detected by the photodetector 30 is minimized, and then the polarizer film 12b is wound by a rewinder 34. These rolls and devices are mounted on and supported by a frame 36.

In contrast, two types of strip-shaped retarder films 42a, 42b are unwound from an unwinder 40 through nip rolls 44. The retarder films 42a, 42b are supplied to a position on the polarizer film 12b, to which the sticky agent is applied, above the laminate-punch unit 24 at a predetermined gap through free rolls 46 and 48, thereby a retarder film transport means for transporting the retarder films 42a, 42b is arranged.

A light source 50 composed of an incandescent lamp, a polarization device 52, a polarizer 54 disposed such that the absorption axis thereof is orthogonal to the polarization device 52, and a photodetector 56 composed of a photodiode are disposed between the free rolls 46 and 48 so that the angle of a retarder film 42 is detected and controlled. More specifically, the absorption axis of the polarization device 52 is disposed in parallel with the roll axes of the unwinder 40, the nip rolls 44, and the free rolls 46 and 48, the angles of the retarder films 42a, 42b are controlled by a pair of axially-movable nip rolls 58 so that the intensity of light detected by the photodetector 56 is minimized, and the retarder film 42 is wound by a rewinder 60. These rolls and the devices are mounted on and supported by a frame 62.

The direction in which the retarder films 42a, 42b are transported and the direction in which the polarizer film 12b is transported can be set to have an arbitrary angle by changing the angle between the frames 36 and 62 according to an object of an optical film to be manufactured. After a target angle is set as described above, the angle can be controlled with a high accuracy by optically detecting the actual angle between the films as described above and minutely adjusting it.

Both the films are laminated by the laminate/punch unit 24 and only the retarder films 42a, 42b are cut off by being punched out.

Figure 3:
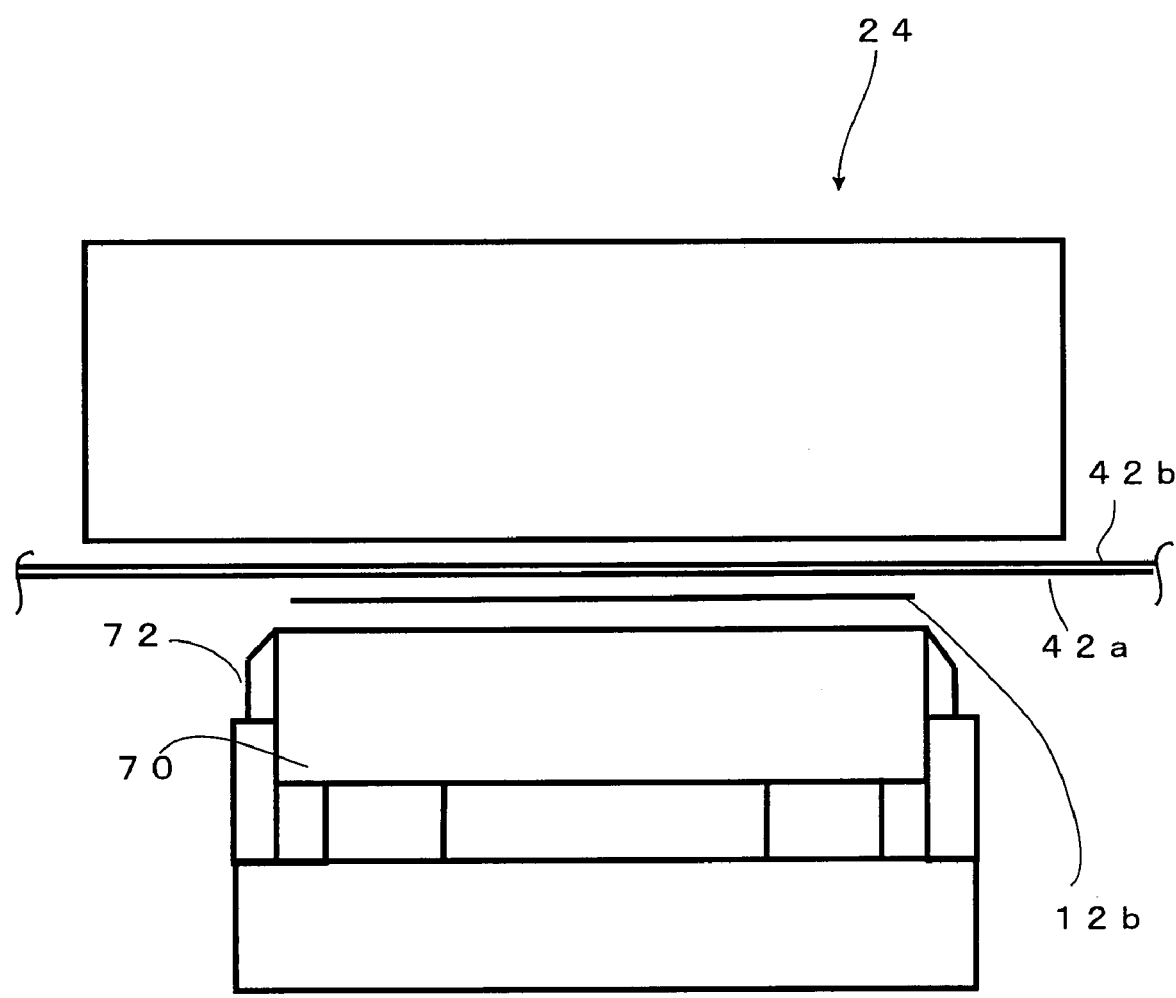
FIG. 3 is an enlarged view of a laminate/punch unit of the apparatus for manufacturing the polarization plate of the present invention as well as a sectional view observed from a direction from which the polarizer film is transported.
Figure 4:
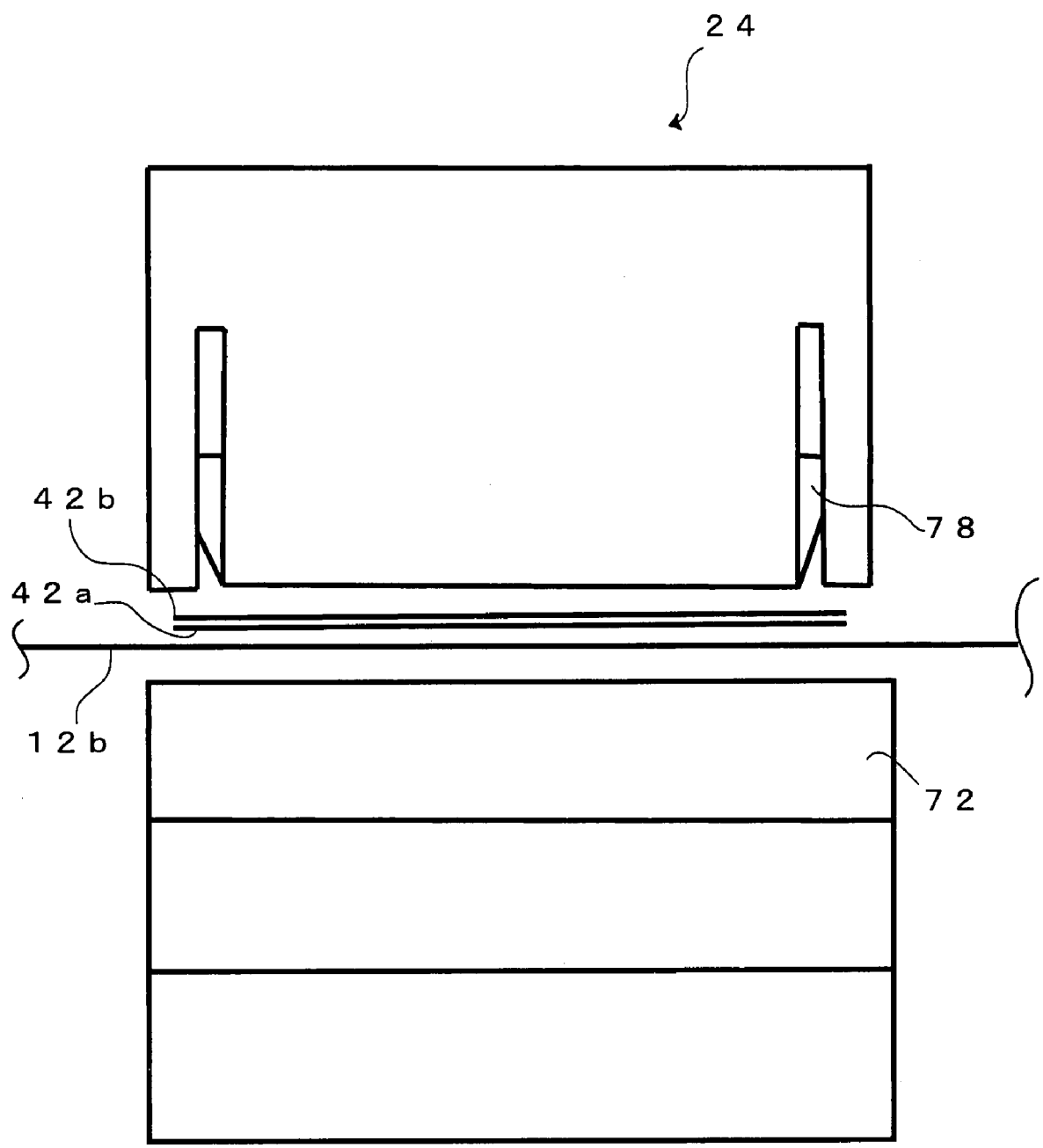
FIG. 4 is an enlarged view of the laminate/punch unit of the apparatus for manufacturing the polarization plate of the present invention as well as a sectional view observed from a direction from which the retarder films are transported.

FIG. 3 is an enlarged view of the laminate/punch unit 24 as well as a sectional view observed from a direction from which the polarizer film 12b is transported. FIG. 4 is an enlarged view of the laminate/punch unit 24 and as well as a sectional view observed from a direction from which the retarder films 42a, 42b are transported likewise.

When a pressure plate 70 moves upward, the polarizer film 12b is laminated to the retarder films 42a, 42b by a predetermined pressure. Subsequently, a cutting blade 72 moves upward and cuts off only the retarder films 42a, 42b to the width of the polarizer film 12b. Next, the cutting blade 72 moves downward and returns to an initial position, and a cutting blade 78 moves downward by the thickness of the retarder films 42a, 42b and cuts off only the retarder film 42. At the time, the retarder films 42a, 42b are punched out with a continuous ear portion remaining so that the angle thereof can be controlled by the nip rolls 58. In the bonding/punching operation, transportation of the polarizer film 12b and the retarder films 42a, 42b are temporarily stopped.

A product, which is composed of the polarizer film 12b and the retarder films 42a, 42b laminated to the polarizer film 12b, is rewound by the rewinder 34 in the rolled state. In contrast, the remaining ear portion from which the retarder films 42a, 24b are cut off is rewound by the rewinder 60. The roll-state laminated product can be obtained as described above.

Figure 5:
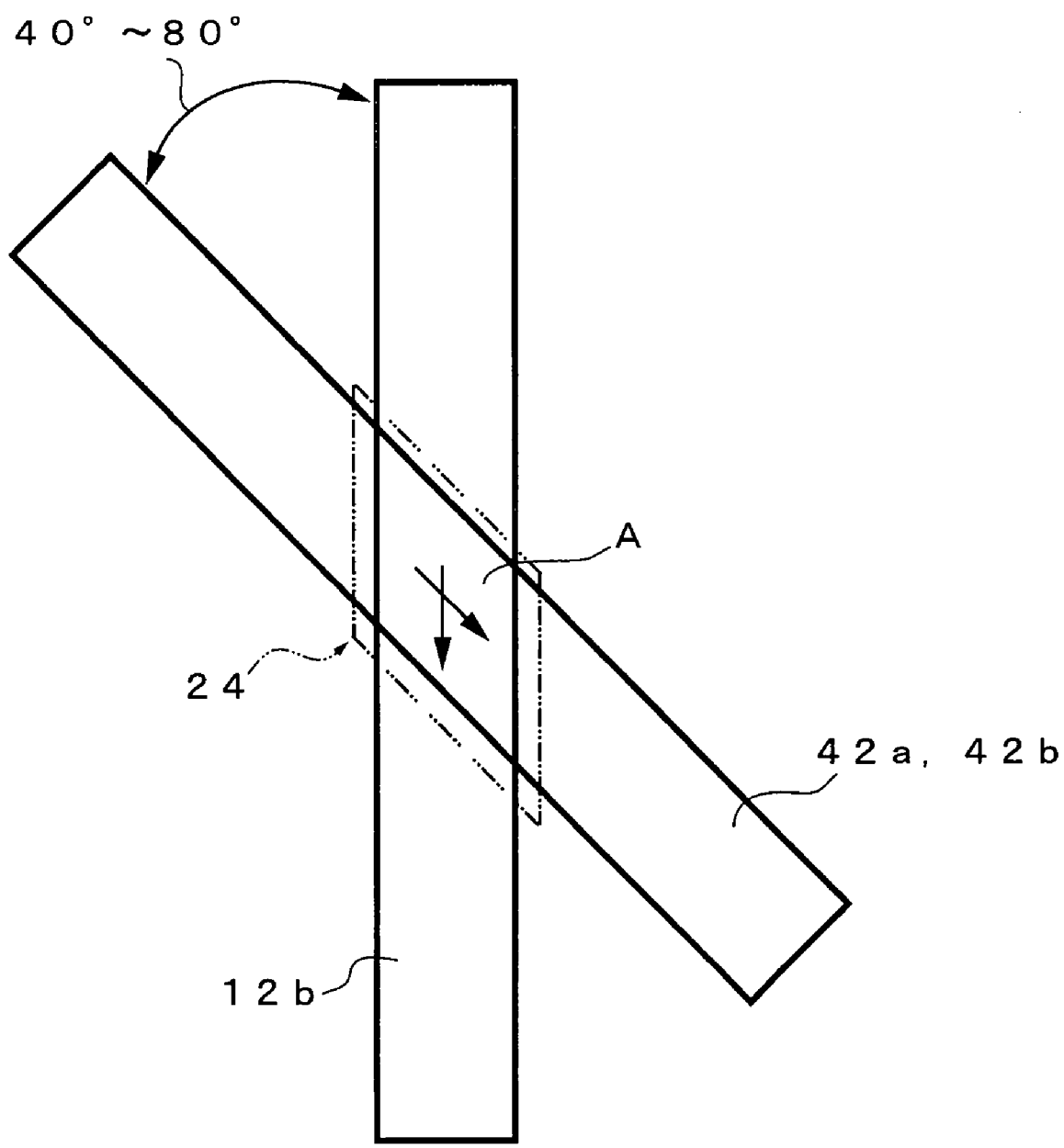
FIG. 5 is view showing an embodiment in which the two types of the strip-shaped retarder films are laminated and laminated onto the strip-shaped polarizer film.

FIG. 5 is a view showing an embodiment in which two types of strip-shaped retarder films are laminated and then laminated onto a strip-shaped polarizer film. In the embodiment, the retarder films 42a, 42b are laminated to the strip-shaped polarizer film 12b such that the difference in the angle between the feeding directions is within the range of 40° to 80°. In the embodiment, the two types of retarder films 42a, 42b may have the same feeding direction or a different feeding direction, and they are transported in a laminated state.

Figure 6:
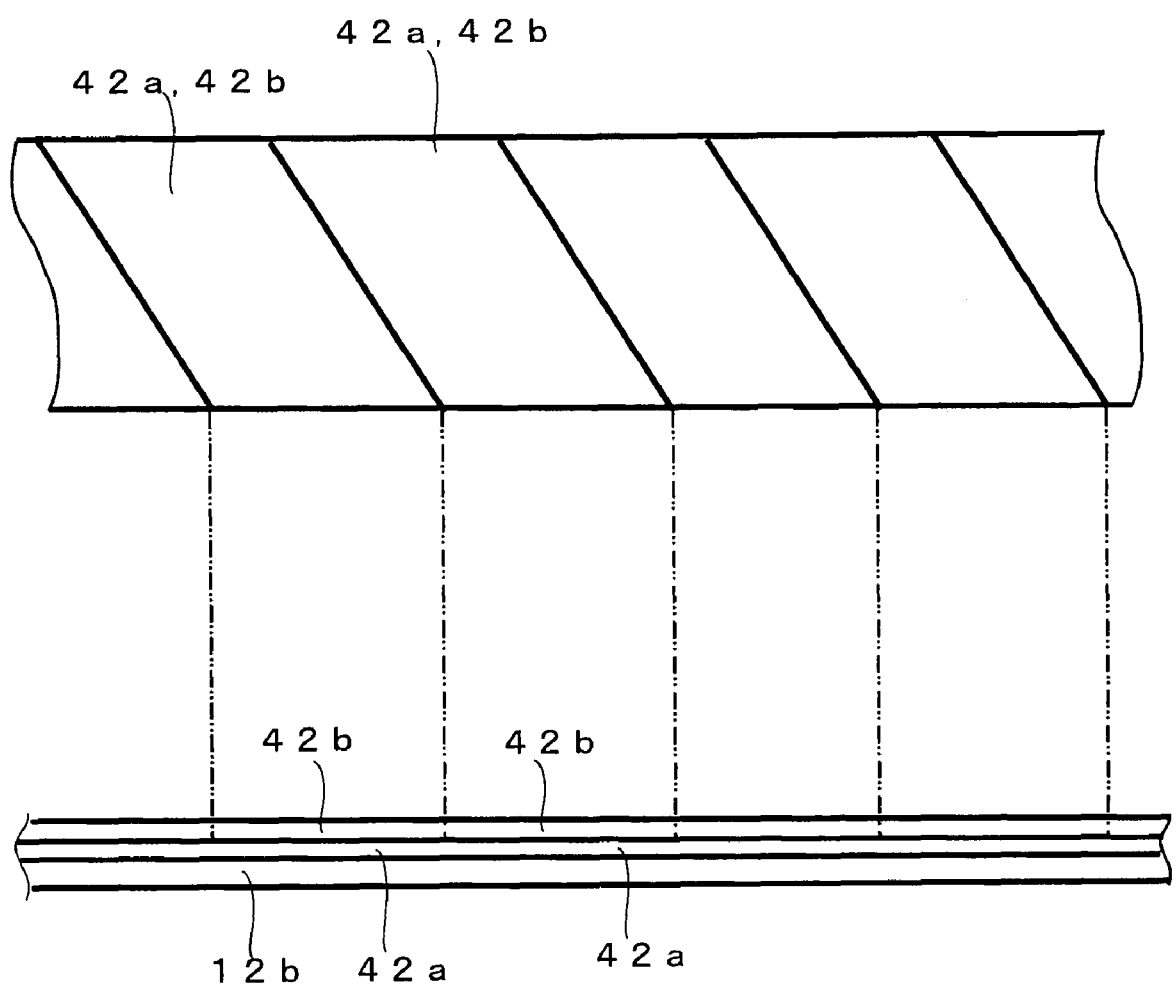
FIG. 6 shows a product composed of the polarizer film on which the retarder films are laminated, wherein a part (a) is a plan view, and part (b) is a side elevational view.

FIG. 6 shows a product composed of the polarizer film onto which the retarder films are laminated as described above, wherein a part (a) shows plan view and (b) shows a side elevational view. The punched-out retarder films 42a, 42b are laminated onto the continuous film polarizer 12b.

As shown in FIGS. 5 and 6, the product composed of the polarizer film onto which the retarder films are laminated is not formed in an extremely slender parallelogram shape A as the laminated shape of the product. Since the parallelogram shape A as the laminated shape is an approximately regular parallelogram shape, a good handling property can be obtained and an improvement in the yield ratio can be expected. Further, the size of the laminate/punch device 24 can be reduced because the parallelogram shape A is not made to an extremely slender shape, thereby an increase in length of the apparatus can be prevented because the installation area of the apparatus can be reduced.

In the embodiment, the polarization plate of the product, in which the angle of the two the retarder films 42a, 42b in the drawing direction thereof is 75°±10° to the polarizer film 12b and the retarder films 42a, 42b are laminated to the polarizer film 12b, can be obtained.

Figure 7:
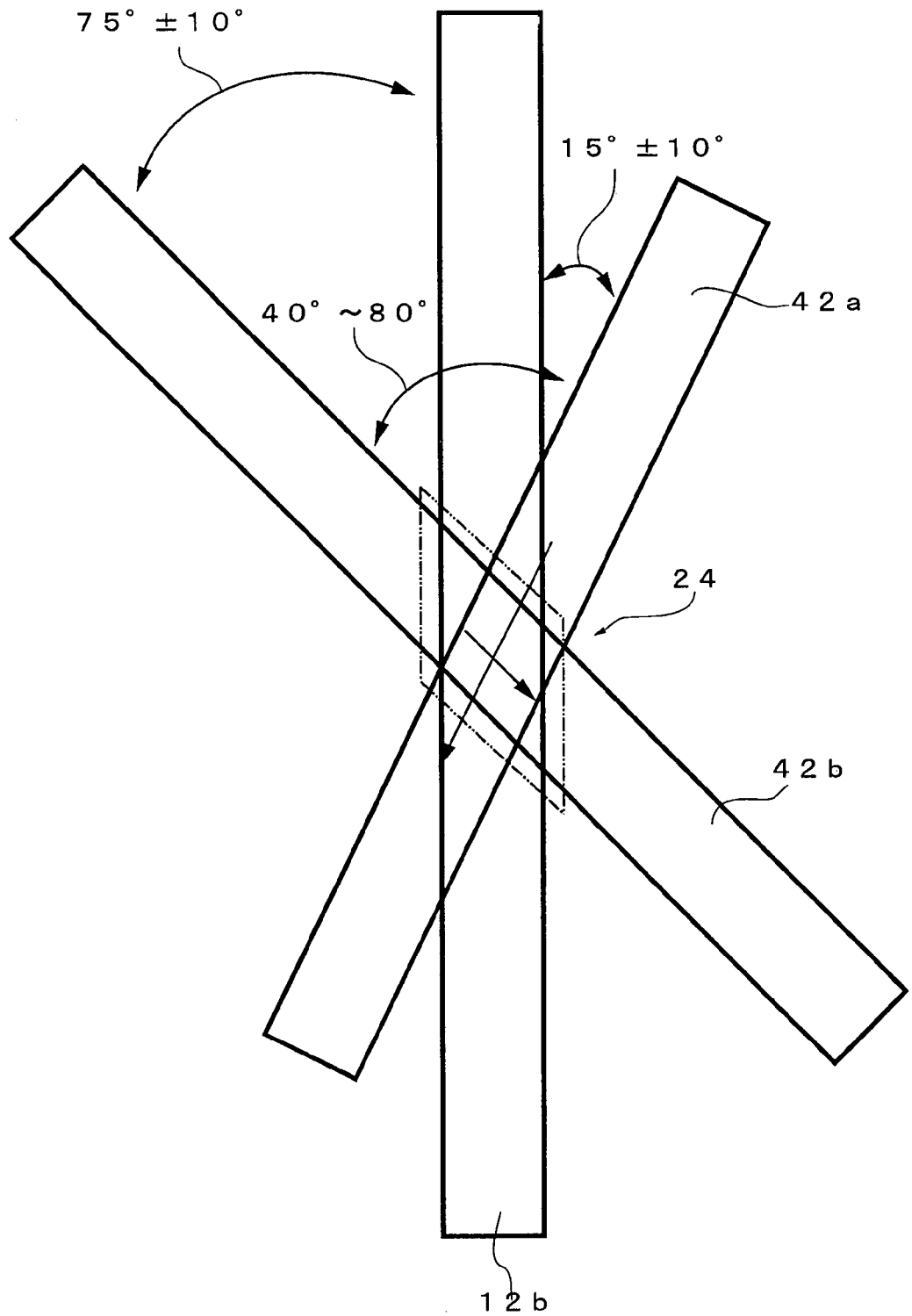
FIG. 7 is a view showing another embodiment in which at least the two types of the strip-shaped retarder films are laminated and laminated onto the strip-shaped polarizer film.

FIG. 7 is a view showing another embodiment of at least two types of strip-shaped retarder films laminated and laminated onto a strip-shaped polarizer film. In the embodiment, the two types of the retarder films 42a, 42b are laminated to the strip-shaped polarizer film 12b while being individually transported from different directions.

In the embodiment, the two types of retarder films 42a, 42b in the different feeding directions are laminated such that the difference in the angles between the feeding directions is within the range of 40° to 80°. It is possible to obtain a product of a polarization plate in which the angle of the retarder film 42a on one hand in the feeding direction thereof to the polarizer film 12b is 15°±10°, the angle of the retarder film 42b on the other hand in the feeding direction thereof to the polarizer film 12b is 75°±10°, and the retarder films 42a, 42b are laminated to the polarizer film 12b.

Figure 8:
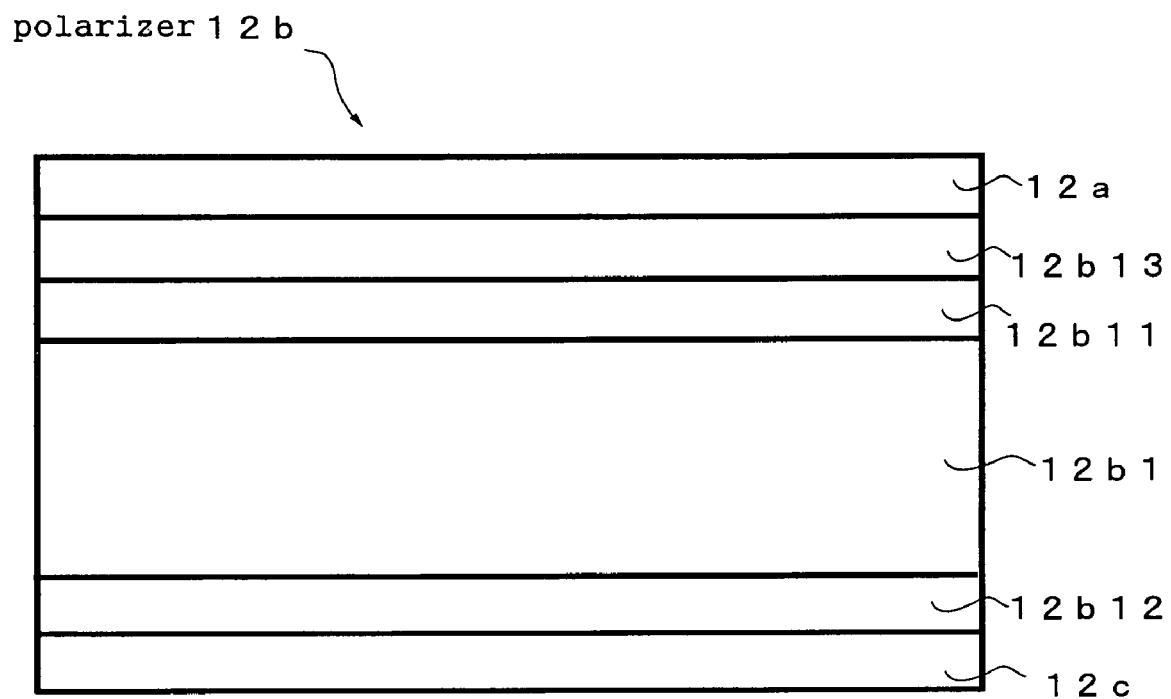
FIG. 8 is a view showing the fundamental structure of the polarizer film used in the embodiment.

The fundamental structure of the polarizer film used in the embodiment is shown in FIG. 8. The strip-shaped polarizer 12b has such a structure that a polarizer film 12b1, which is, for example, a polarization layer and composed of PVA (polyvinyl alcohol) and the like, is sandwiched between two TAC (triacetyl cellulose) films 12b11, 12b12 as cellulose films. In the polarizer film 12b, a sticky layer 12b13 is formed on the outside surface of the TAC film 12b13 on the one hand, the release film 12a is laminated to the sticky layer 12b13. Further, a protection film 12c is laminated to the outside surface of the TAC film 12b12 on the other hand. Note that the polarizer film 12b is colored with, for example, iodine, a dichroic dye, and the like to shut off light other than the light vibrating in a given direction.

Figure 9:
FIG. 9 is a view showing the fundamental structure of the strip-shaped retarder films used in the embodiment.

The fundamental structure of the strip-shaped retarder films used in the embodiment is as shown in FIG. 9. The strip-shaped retarder films 42a, 42b are retarder films containing, for example, polycarbonate, polyethersulfone, and the like as a phase difference layer 42c1. Each of the retarder films 42a, 42b has a protection film 42c2 laminated on an outside surface thereof as well as a sticky layer 42c3 disposed on the other outside surface thereof so as to be laminated to a liquid crystal display device, and a release film 42c4 is laminated to the sticky layer 42c3.

Figure 10:
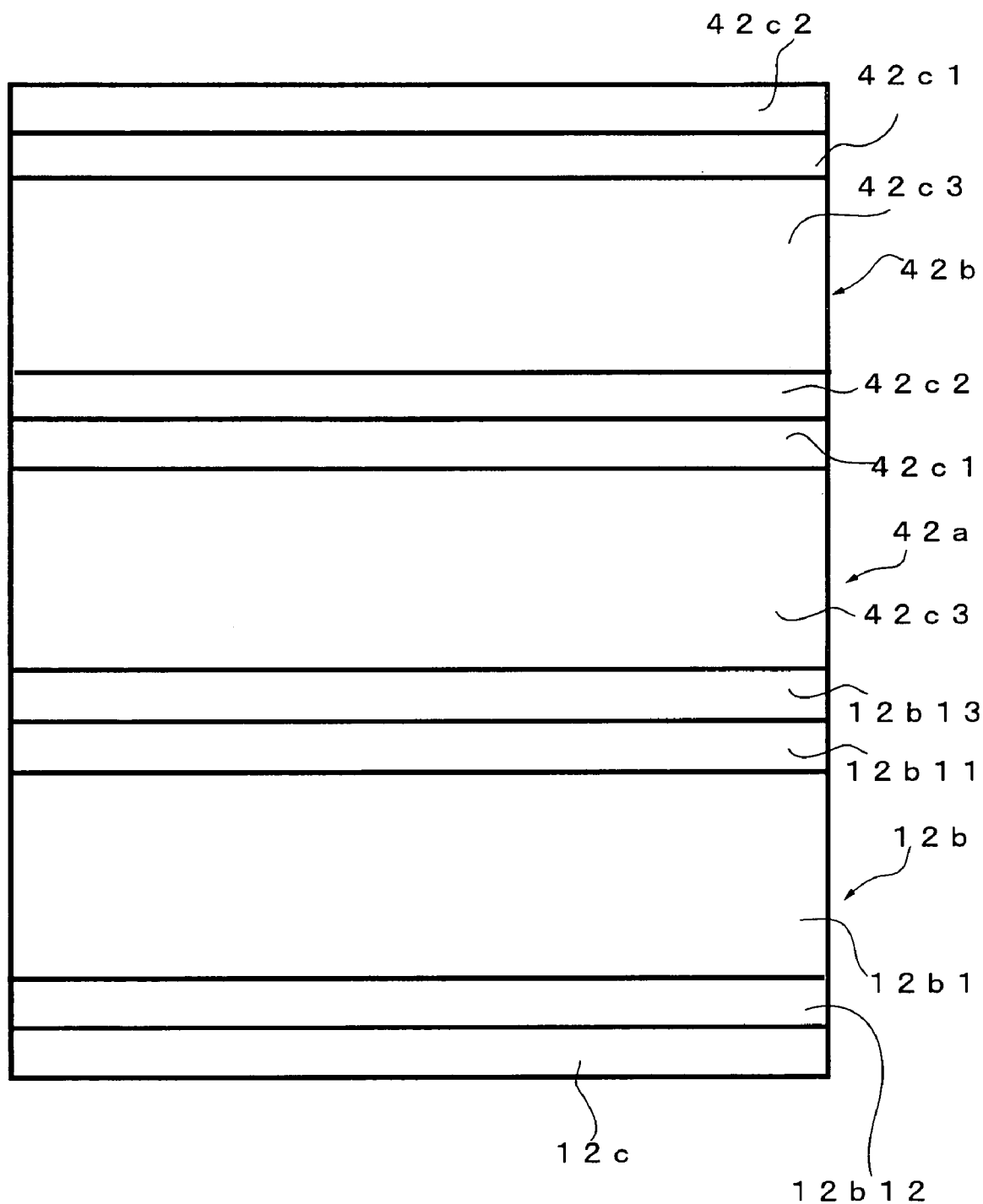
FIG. 10 is a view showing the fundamental structure of the polarization plate of the product composed of the polarizer film on which the retarder films are laminated.

The fundamental structure of the product of the polarization plate in which the retarder films 42a, 42b are laminated onto the polarizer film 12b is as shown in FIG. 10. The release film 12a is removed from the polarizer film 12b, and protection films 20b are removed from the retarder films 42a, 42b, respectively, and the polarizer film 12b is laminated to the retarder film 42a through the sticky layer 42c3. Further, the retarder film 42b is laminated to the retarder film 42a.

In the present invention, the types of retarder films to be laminated are not limited as long as a polarization plate, in which at least two types of retarder films are laminated to the polarizer 12b film, is manufactured. Further, in the structure, since the two films of at least the two types of retarder films and the polarizer film are laminated such that the difference in the angle between the feeding directions of the two films is within the range of 40° to 80°, laminating is carried out so that the difference in the angle between the polarizer film and the feeding direction of any of the retarder films or the difference in the angle between the feeding directions of the retarder films is within the range of 40° to 80°.

INDUSTRIAL APPLICABILITY

In the present invention, since the two films of at least the two types of retarder films including at least the polarizer film are laminated such that the difference of the angle between the feeding directions of the two films is within the range of 40° to 80°, they are not laminated in, for example, an extremely slender parallelogram shape. Accordingly, a good handling property can be obtained and improvement of a yield ratio can be expected as well since the size of the apparatus can be reduced, an increase in length of the apparatus can be prevented by reducing the installation area thereof.

The invention claimed is:

1. A method of manufacturing a polarization plate in which at least two types of retarder films are laminated onto a polarizer film to form a product polarizer, comprising the steps of:
   feeding a polarizer film from a roll in a first feed direction;
   feeding at least two retarder films in a feed direction different from the first feed direction;
   stopping the feeding of the polarizer film and the at least two retarder films when they reach a predetermined position and a relative angle difference in the feed directions of the polarized film and the at least two retarder films is in the range of 40-80°;
   forming a laminate of the polarizer film and the at least two retarder films at the predetermined position;
   punching out only the at least two retarder films at the predetermined position within the width of the polarizer film to form the product polarizer and contiguous portions of the remaining at least two retarder films;
   winding the product polarizer into a roll; and
   winding the contiguous portions of the remaining at least two retarder films into a roll.

2. The method of claim 1, wherein at least two of the retarder films are fed in different directions.

3. The method of claim 1, additionally comprising the steps of using light sources and photodetectors to monitor and control the feed direction relative angle differences between the polarizer film and the at least two retarder films.

4. A method of manufacturing a polarizing plate in which at least two types of retarder films are laminated onto a polarizer film to form a product polarizer, comprising the steps of:
   feeding a polarizer film from a roll in a first feed direction;
   feeding at least two retarder films in a feed direction different from the first feed direction;
   stopping the feeding of the polarizer film and the at least two retarder films when they reach a predetermined position and a relative angle difference in the feed directions of the polarizer film and at least one of the retarder films is 15°±10° or 75°±10°;
   forming a laminate of the polarizer film and the at least two retarder films at the predetermined position;
   punching out only the at least two retarder films at the predetermined position within the width of the polarizer film to form the product polarizer and contiguous portions of the remaining at least two retarder films;
   winding the product polarizer into a roll; and
   winding the contiguous portions of the remaining at least two retarder films into a roll.

5. The method of claim 4, wherein at least two of the retarder films are fed in different directions.

6. The method of claim 4, additionally comprising the steps of using light sources and photodetectors to monitor and control the feed direction relative angle differences between the polarizer film and the at least two retarder films.

* * * * *